United States Patent
Jang

(10) Patent No.: US 9,007,516 B2
(45) Date of Patent: Apr. 14, 2015

(54) SHUTTER ASSEMBLY AND PHOTOGRAPHING APPARATUS INCLUDING THE SAME

(71) Applicant: Samsung Electronics Co., Ltd., Suwon-si, Gyeonggi-do (KR)

(72) Inventor: Yong-wook Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 13/661,348

(22) Filed: Oct. 26, 2012

(65) Prior Publication Data

US 2013/0258176 A1   Oct. 3, 2013

(30) Foreign Application Priority Data

Apr. 2, 2012  (KR) ........................ 10-2012-0034120

(51) Int. Cl.
| H04N 5/238 | (2006.01) |
| G03B 9/14 | (2006.01) |
| G03B 9/10 | (2006.01) |
| G03B 9/20 | (2006.01) |

(52) U.S. Cl.
CPC ... *G03B 9/10* (2013.01); *G03B 9/14* (2013.01)

(58) Field of Classification Search
CPC ..... H04N 5/238; H04N 5/2353; H04N 5/353; H04N 5/2254
USPC .......... 348/362, 367–368; 396/449–452, 473, 396/475–477, 493, 498
See application file for complete search history.

(56) References Cited

U.S. PATENT DOCUMENTS

| 2,039,341 | A |  | 5/1936 | Parish |
| 2,305,201 | A |  | 12/1942 | Sloan |
| 3,843,243 | A |  | 10/1974 | Takigawa et al. |
| 6,747,703 | B1 | * | 6/2004 | Simamura ..................... 348/362 |
| 7,637,675 | B2 | * | 12/2009 | Sakai et al. ................... 396/505 |
| 8,482,661 | B2 | * | 7/2013 | Misawa ........................ 348/367 |
| 2004/0161230 | A1 | * | 8/2004 | Hosokawa et al. ........... 396/177 |
| 2005/0110897 | A1 | * | 5/2005 | Wakabayashi ................ 348/362 |
| 2007/0019945 | A1 | * | 1/2007 | Kurosawa ..................... 396/296 |
| 2010/0026881 | A1 | * | 2/2010 | Kim ............................. 348/362 |
| 2010/0092166 | A1 |  | 4/2010 | Kawamoto |
| 2010/0284685 | A1 |  | 11/2010 | Ichihara et al. |
| 2011/0103787 | A1 |  | 5/2011 | Niwamae |
| 2011/0158635 | A1 | * | 6/2011 | Hwang ......................... 396/463 |

OTHER PUBLICATIONS

Extended European Search Report issued for EP 12187857.3 (Sep. 4, 2014).

* cited by examiner

*Primary Examiner* — Kelly L Jerabek
(74) *Attorney, Agent, or Firm* — Drinker Biddle & Reath LLP

(57) ABSTRACT

A shutter assembly includes: a driver for generating a rotation force; an input gear unit rotated by the driver; a transmission gear unit rotated by the input gear unit; an output gear unit rotated by the transmission gear unit; and a rotation unit that is rotated by the output gear unit between a position for transmitting light and a position for blocking light, wherein the transmission gear unit at least partially corresponds to a rotation path of the rotation unit and is spaced apart from a surface containing the rotation path along a direction of a central axis of the transmission gear unit.

15 Claims, 7 Drawing Sheets

SHUTTER ASSEMBLY AND PHOTOGRAPHING APPARATUS INCLUDING THE SAME

CROSS-REFERENCE TO RELATED PATENT APPLICATION

This application claims the priority benefit of Korean Patent Application No. 10-2012-0034120, filed on Apr. 2, 2012, in the Korean Intellectual Property Office, the disclosure of which is incorporated herein in its entirety by reference.

BACKGROUND

Various embodiments relate to a shutter assembly and a photographing apparatus including the same, and more particularly, to a shutter assembly that facilitates miniaturization and a photographing apparatus including the same.

Recently, image forming optical devices such as digital cameras or digital camcorders have been rapidly and widely used. A digital camera or the like includes an image device for converting incident light into an electrical signal, such as a charge coupled device (CCD) or a complementary metal-oxide semiconductor (CMOS).

In this case, a digital camera or the like includes a shutter for adjusting whether light is transmitted or not such that light incident on the digital camera from an external source may reach an imaging device for a predetermined period of time only.

The shutter may include a general shutter that is closest to an object to be photographed by a digital camera, and a focal plane shutter that is disposed in front of the imaging device and adjusts whether light incident through an optical system is transmitted toward the imaging device or not.

Each of the general shutter and the focal plane shutter includes a light blocking plate for blocking or transmitting light. The light blocking plate receives a driving force from a driver such as a motor or the like and is moved between a light blocking position and a light transmitting position.

In this case, a gear assembly for transferring the driving force to the light blocking plate from the driver is disposed between the driver and the light blocking plate and occupies a predetermined space in a digital camera or the like.

Thus, there is a need to ensure a space that is occupied by a light blocking plate, a driver, and a gear assembly in a digital camera or the like, and thus, it is difficult to miniaturize a digital camera or the like.

SUMMARY

Various embodiments provide a shutter assembly that facilitates miniaturization and a photographing apparatus including the same.

According to an embodiment, there is provided a shutter assembly including a driver that generates a rotation force; an input gear unit rotated by the driver; a transmission gear unit rotated by the input gear unit; an output gear unit rotated by the transmission gear unit; and a rotation unit that is rotated by the output gear unit between a position for transmitting light and a position for blocking light, wherein the transmission gear unit at least partially corresponds to a rotation path of the rotation unit and is spaced apart from a surface containing the rotation path along a direction of a central axis of the transmission gear unit.

The input gear unit may include a first input gear unit coupled to a driving gear coupled to a rotation axis of the driver and receives a rotation force from the driver, and a second input gear unit that transmits a rotation force to the transmission gear unit, and the first input gear unit and the second input gear unit may be disposed side by side along a direction of a central axis of the input gear unit.

The first input gear unit and the second input gear unit may include different numbers of teeth.

The driving gear may include a worm gear, the first input gear unit may include a helical gear, and the second input gear unit may include a spur gear.

The output gear unit may include a first output gear unit that receives a rotation force from the transmission gear unit, and a second output gear unit coupled to teeth included in the rotation unit and transmits a rotation force, and the first output gear unit and the second output gear unit may be disposed side by side along a direction of a central axis of the output gear unit.

The first output gear unit and the second output gear unit may include different numbers of teeth.

The shutter assembly may include a support member that rotatably supports the input gear unit, the transmission gear unit, and the output gear unit.

The input gear unit, the transmission gear unit, and the output gear unit may be disposed on one side surface of the support member.

The support member may include a first accommodating unit that accommodates an end portion of the input gear unit; a second accommodating unit that accommodates the transmission gear unit; a third accommodating unit that accommodates an end portion of the output gear unit; a first through hole disposed between the first accommodating unit and the second accommodating unit; and a second through hole disposed between the second accommodating unit and the third accommodating unit.

The first accommodating unit and the third accommodating unit may be disposed on a first side surface of the support member, the second accommodating unit may be disposed on a second side surface of the support member, the input gear unit and the transmission gear unit may be coupled to each other through the first through hole, and the transmission gear unit and the output gear unit may be coupled to each other through the second through hole.

The shutter assembly may further include a cover member disposed on the second side surface of the support member, wherein the transmission gear unit may be disposed between the support member and the cover member.

The transmission gear unit may include a plurality of gears.

The shutter assembly may further include a shutter plate including a through hole through which light is transmitted, wherein the rotation unit may include a blocking plate that opens or closes the through hole, and a lever that is coupled to the blocking plate and is rotated by the output gear unit, the transmission gear unit at least may partially correspond to a rotation path of the lever and is spaced apart from the surface containing the rotation path along the direction of the central axis of the transmission gear unit.

The blocking plate may include a first blocking plate and a second blocking plate that are spaced apart from each other when the through hole is opened and contact each other when the through hole is closed, and the lever may include a first lever and a second lever that respectively move the first blocking plate and the second blocking plate.

The shutter assembly may further include a cam gear rotated by the output gear unit, wherein the first lever and the second lever may be simultaneously rotated by the cam gear.

According to another embodiment, there is provided a photographing apparatus including a driver that generates a rotation force; an input gear unit rotated by the driver; a transmission gear unit rotated by the input gear unit; an output gear unit rotated by the transmission gear unit; a rotation unit that is rotated by the output gear unit between a position for transmitting light and a position for blocking light; and an imaging device that converts transmitted light into an electrical signal when the rotation unit is in a position for transmitting light, wherein the transmission gear unit at least partially corresponds to a rotation path of the rotation unit and is spaced apart from a surface containing the rotation path along a direction of a central axis of the transmission gear unit.

The photographing apparatus may further include a support member that rotatably supports the input gear unit, the transmission gear unit, and the output gear unit.

The support member may include a first accommodating unit that accommodates an end portion of the input gear unit; a second accommodating unit that accommodates the transmission gear unit; a third accommodating unit that accommodates an end portion of the output gear unit; a first through hole disposed between the first accommodating unit and the second accommodating unit; and a second through hole disposed between the second accommodating unit and the third accommodating unit.

The first accommodating unit and the third accommodating unit may be disposed on a first side surface of the support member, the second accommodating unit may be disposed on a second side surface of the support member, the input gear unit and the transmission gear unit may be coupled to each other through the first through hole, and the transmission gear unit and the output gear unit may be coupled to each other through the second through hole.

The photographing apparatus may further include a cover member disposed on the second side surface of the support member, wherein the transmission gear unit may be disposed between the support member and the cover member.

BRIEF DESCRIPTION OF THE DRAWINGS

The above and other features and advantages will become more apparent by describing in detail exemplary embodiments thereof with reference to the attached drawings in which.

DETAILED DESCRIPTION

Hereinafter, exemplary embodiments will be described in detail with reference to the attached drawings. As used herein, the term "and/or" includes any and all combinations of one or more of the associated listed items.

Figure 1:
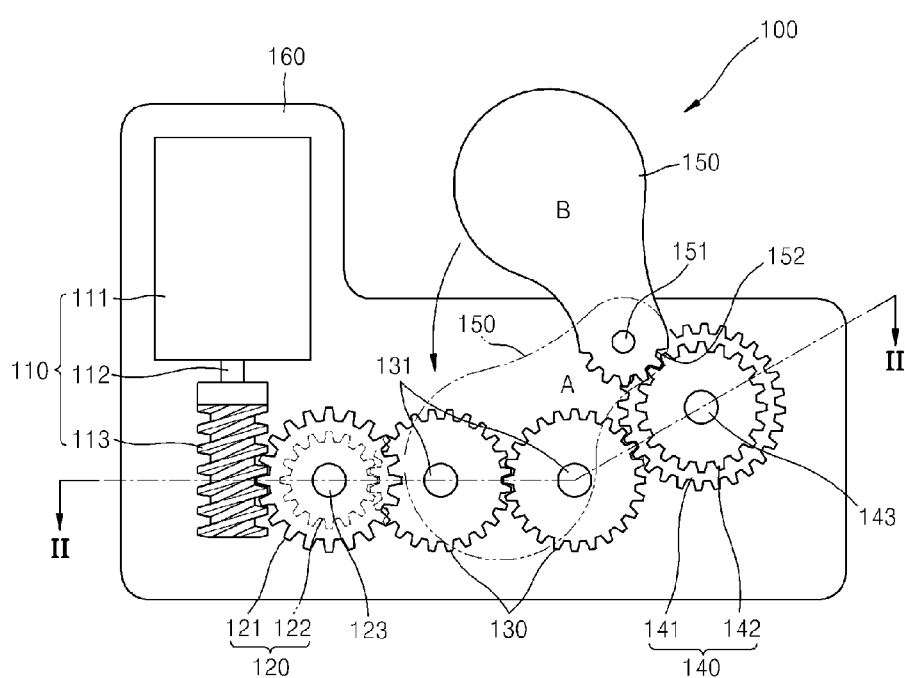
FIG. 1 is a plan view of a shutter assembly, according to an embodiment.
Figure 2:
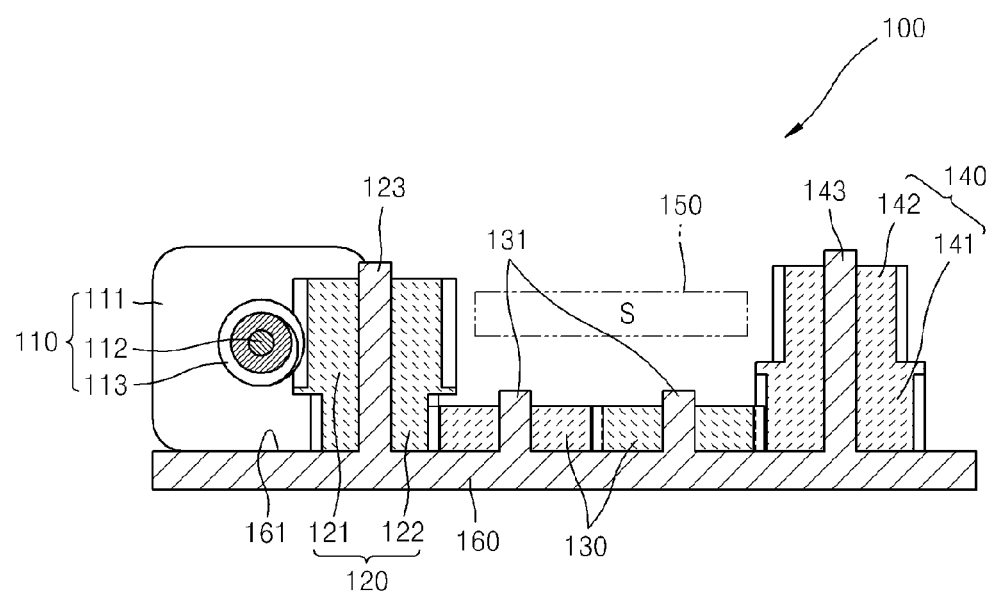
FIG. 2 is a cross-sectional view of the shutter assembly taken along a line II-II of FIG. 1, according to an embodiment.

FIG. 1 is a plan view of a shutter assembly 100, according to an embodiment. FIG. 2 is a cross-sectional view of the shutter assembly 100 taken along a line II-II of FIG. 1, according to an embodiment.

Referring to FIGS. 1 and 2, the shutter assembly 100 includes a driver 110 for generating a rotation force, an input gear unit 120 that is rotated by the driver 110, transmission gear units 130 that are rotated by the input gear unit 120, an output gear unit 140 that is rotated by the transmission gear units 130, and a rotation unit 150 that is rotated by the output gear unit 140 between a position 'A' for transmitting light and a position 'B' for blocking light. The transmission gear units 130 may at least partially correspond to a rotation path of the rotation unit 150 and may be spaced apart from a surface 'S' containing a rotation path along a direction of each of central axes 131 of the transmission gear units 130.

The driver 110 may include a motor body unit 111, a motor rotation axis 112, and a driving gear 113 coupled to the motor rotation axis 112. The driving gear 113 may be a worm gear including one or more screw threads. The input gear unit 120 may be coupled to the driving gear 113 of the driver 110 and may be rotated by the driver 110. In this case, the input gear unit 120 may include a first input gear unit 121 that is a type of helical gear and is coupled to the worm gear, and a second input gear unit 122 that is a type of spur gear.

In this case, a central axis 123 of the input gear unit 120 may be perpendicular to the motor rotation axis 112.

A driving force may be transmitted between the driver 110 and the input gear unit 120, which have central axes perpendicular to each other, by the driving gear 113 including the worm gear and the first input gear unit 121 having a helical shape. During the transmission of the driving force, a high reduction ratio may be obtained. In addition, the first input gear unit 121 and the second input gear unit 122 may be disposed side by side along a direction of the central axis 123 of the input gear unit 120. Additional reduction of speed may be performed by adjusting a teeth ratio between the first input gear unit 121 and the second input gear unit 122.

According to the present embodiment, the motor rotation axis 112 and the central axis 123 of the input gear unit 120 are disposed perpendicular to each other.

The driving gear 113 includes a worm gear, and the first input gear unit 121 is a type of helical gear corresponding to the worm gear. However, the present embodiment is not limited thereto.

That is, the motor rotation axis 112 may be inserted directly into a rotation central portion of the input gear unit 120 and may rotate the input gear unit 120.

The transmission gear unit 130 is coupled to the second input gear unit 122 and is rotated by the input gear unit 120. According to the present embodiment, the transmission gear unit 130 includes two gears but the invention is not limited thereto. Alternatively, the transmission gear unit 130 may include one or three or more gears according to a distance between the input gear unit 120 and the output gear unit 140.

The output gear unit 140 is coupled to the transmission gear unit 130 and is rotated by the transmission gear unit 130. In this case, the output gear unit 140 may include a first output gear unit 141 for receiving a rotation force from the transmission gear unit 130 and a second output gear unit 142 that is coupled to teeth 152 included in the rotation unit 150 and transmits a rotation force to the rotation unit 150.

The first output gear unit 141 and the second output gear unit 142 may be disposed side by side along a direction of a central axis 143 of the output gear unit 140. Additional reduction of speed may be performed by adjusting a teeth ratio between the first output gear unit 141 and the second output gear unit 142.

The rotation unit 150 is rotated by the output gear unit 140 between the position 'A' for transmitting light and the position 'B' for blocking light. The position 'B' for blocking light may be a region corresponding to, for example, an optical system and/or an imaging device of a photographing apparatus.

In this case, the transmission gear unit 130 may at least partially correspond to a rotation path of the rotation unit 150 and may be spaced apart from the surface 'S' containing a rotation path along the direction of each of the central axes 131 of the transmission gear units 130.

That is, a rotation path of the transmission gear unit 130 and the rotation path of the rotation unit 150 may at least partially overlap with each other, which may be observed from above. Thus, an additional planar space for the transmission gear unit 130 does not have to be ensured, thereby facilitating miniaturization of the shutter assembly 100.

According to the present embodiment, the shutter assembly 100 may further include a support member 160 for supporting the driver 110, the input gear unit 120, the transmission gear unit 130, the output gear unit 140, and the rotation unit 150. The driver 110, the input gear unit 120, the transmission gear unit 130, the output gear unit 140, and the rotation unit 150 are disposed on one side surface 161 of the support member 160.

In this case, the support member 160 may include central axes 123, 131, 143, and 151 that respectively correspond to rotation centers of the input gear unit 120, the transmission gear unit 130, the output gear unit 140, and the rotation unit 150.

However, the present embodiment is not limited thereto and the driver 110 and the rotation unit 150 may be supported by separate respective members.

Figure 3:
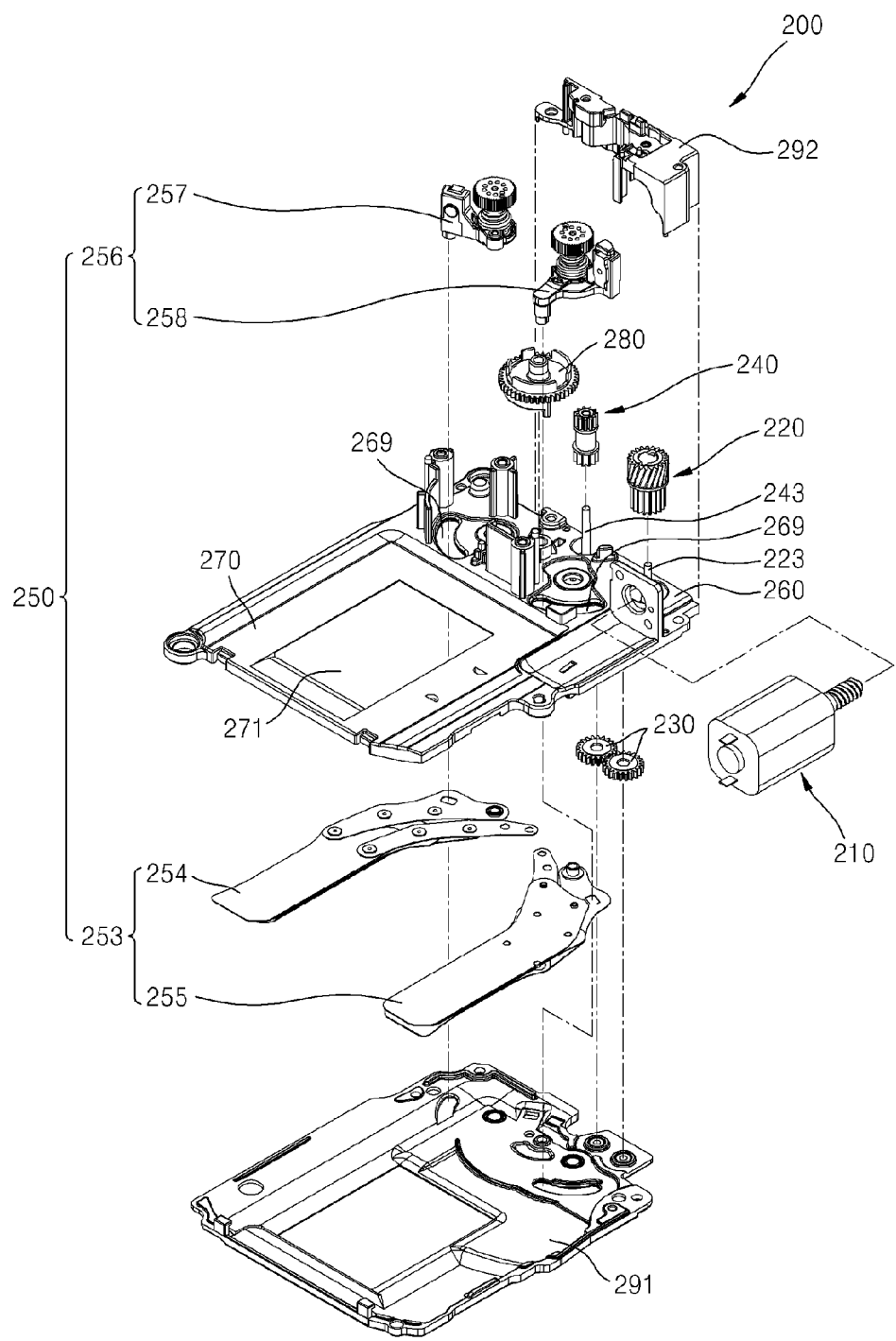
FIG. 3 is an exploded perspective view of a shutter assembly, according to another embodiment.
Figure 4:
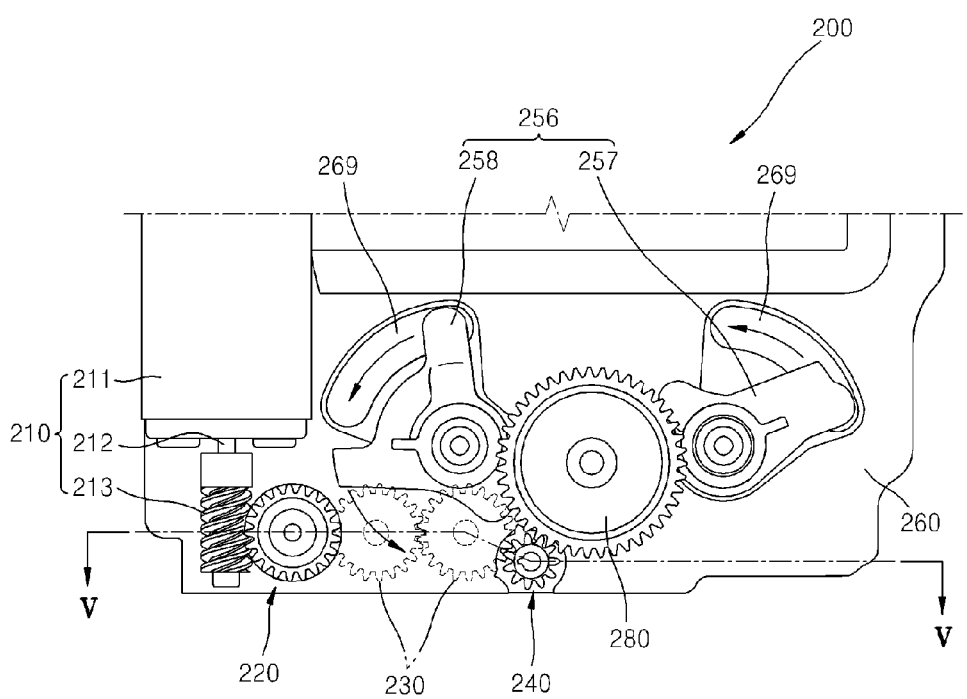
FIG. 4 is a plan view showing an arrangement relationship between gears included in the shutter assembly of FIG. 3, according to another embodiment.

FIG. 3 is an exploded perspective view of a shutter assembly 200, according to another embodiment. FIG. 4 is a plan view showing an arrangement relationship between gears included in the shutter assembly 200 of FIG. 3, and FIG. 5 is a cross-sectional view of the shutter assembly 200 taken along a line V-V of FIG. 4.

Figure 5:
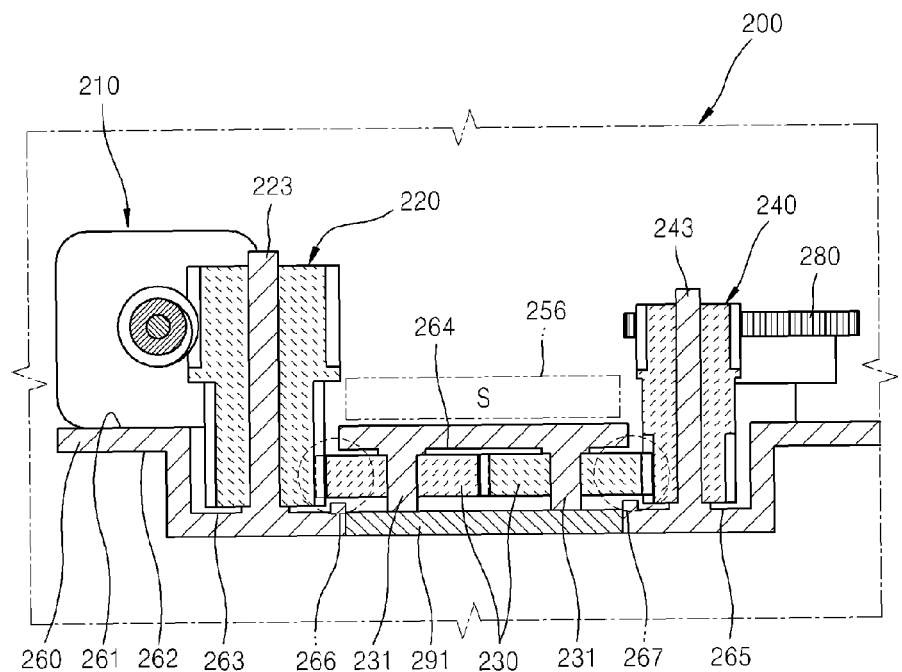
FIG. 5 is a cross-sectional view of the shutter assembly taken along a line V-V of FIG. 4, according to another embodiment.

Referring to FIGS. 3, 4, and 5, the shutter assembly 200 includes a shutter plate 270 including a through hole 271, and a rotation unit 250 including blocking plates 253 for opening or closing the through hole 271 and levers 256 connected to the blocking plates 253.

In addition, according to the present embodiment, the shutter assembly 200 includes a driver 210 for generating a rotation force, an input gear unit 220 rotated by the driver 210, transmission gear units 230 rotated by the input gear unit 220, and an output gear unit 240 rotated by the transmission gear units 230, in order to rotate the rotation unit 250.

The driver 210 may include a motor body unit 211, a motor rotation axis 212, and a driving gear 213 coupled to the motor rotation axis 112. The driving gear 213 may be a worm gear including one or more screw threads.

The shutter plate 270 includes the through hole 271 that corresponds to, for example, an optical system and/or an imaging device of a photographing apparatus.

The blocking plates 253 may include a first blocking plate 254 and a second blocking plate 255 that are spaced apart from each other when the through hole 271 is opened and contact each other when the through hole 271 is closed.

The levers 256 may include a first lever 257 and a second lever 258 that respectively rotate the first blocking plate 254 and the second blocking plate 255. The first lever 257 and the second lever 258 may be rotated by the output gear unit 240.

A cam gear 280 may be disposed between the levers 256 and the output gear unit 240. The first lever 257 and the second lever 258 may be coupled to the cam gear 280 and may be simultaneously rotated by the cam gear 280 receiving a rotation force from the output gear unit 240.

Referring to FIGS. 4 and 5, the levers 256 are rotated by the output gear unit 240 and the cam gear 280. The transmission gear units 230 may at least partially correspond to a rotation path (indicated by an arrow of FIG. 4) and may be spaced apart from the surface 'S' containing a rotation path along a direction of each of central axes 231 of the transmission gear units 230.

According to the present embodiment, the shutter assembly 200 may further include a support member 260 for supporting the driver 210, the input gear unit 220, the transmission gear units 230, the output gear unit 240, the levers 256, and the cam gear 280, and a gear cover 292 for covering the input gear unit 220 and the output gear unit 240 that are disposed on the support member 260. In this case, the support member 260 and the shutter plate 270 may be integrally formed. According to the present embodiment, the levers 256 and the cam gear 280 are supported by the support member 260 but the present embodiment is not limited thereto. Alternatively, the levers 256 and the cam gear 280 may be supported by separate respective members.

The blocking plates 253 and the levers 256 may be disposed on different surface of the support member 260. The support member 260 may connect the levers 256 and the blocking plates 253 to each other and may include third through holes 269 so as to transfer a rotation force of the levers 256 to the blocking plates 253.

Referring to FIG. 5, the support member 260 may include a first accommodating unit 263 for accommodating an end portion of the input gear unit 220, a second accommodating unit 264 for accommodating the transmission gear units 230, and a third accommodating unit 265 for accommodating an end portion of the output gear unit 240.

In this case, the first accommodating unit 263 and the third accommodating unit 265 may be disposed on one side surface 261 of the support member 260 and the second accommodating unit 264 may be disposed on the other side surface 262 of the support member 260.

A central axis 223 of the input gear unit 220 is disposed to correspond to a rotation center of the input gear unit 220 of the first accommodating unit 263. The central axes 231 of the transmission gear unit 230 are disposed to correspond to a rotational center of the transmission gear unit 230 of the second accommodating unit 264. A central axis 243 of the output gear unit 240 is disposed to correspond to a rotation axis of the output gear unit 240 of the third accommodating unit 265.

The support member 260 includes a first through hole 266 formed between the first accommodating unit 263 and the second accommodating unit 264, and a second through hole 267 formed between the second accommodating unit 264 and the third accommodating unit 265. The first through hole 266 and the second through hole 267 are formed so as to connect the input gear unit 220 and the transmission gear unit 230 to each other, and to connect the transmission gear unit 230 and the output gear unit to each other. The input gear unit 220 and the transmission gear unit 230 are disposed on different surfaces of the support member 260. The transmission gear unit 230 and the output gear unit 240 are disposed on different surfaces of the support member 260.

The input gear unit 220 and the transmission gear unit 230 may be coupled to each other through the first through hole 266. The transmission gear unit 230 and the output gear unit 240 may be coupled to each other through the second through hole 267.

According to the present embodiment, the shutter assembly 200 is configured such that the transmission gear unit 230 is disposed on an opposite surface of the support member 260 to a surface on which the levers 256 are disposed, and a rotation path of the levers 256 corresponds to a position of the transmission gear unit 230, thereby obtaining miniaturization of the shutter assembly 200.

A cover member 291 may be further disposed on the opposite surface of the support member 260 on which the transmission gear unit 230 is disposed. In this case, the transmission gear unit 230 may be disposed between the support member 260 and the cover member 291.

Figure 6:
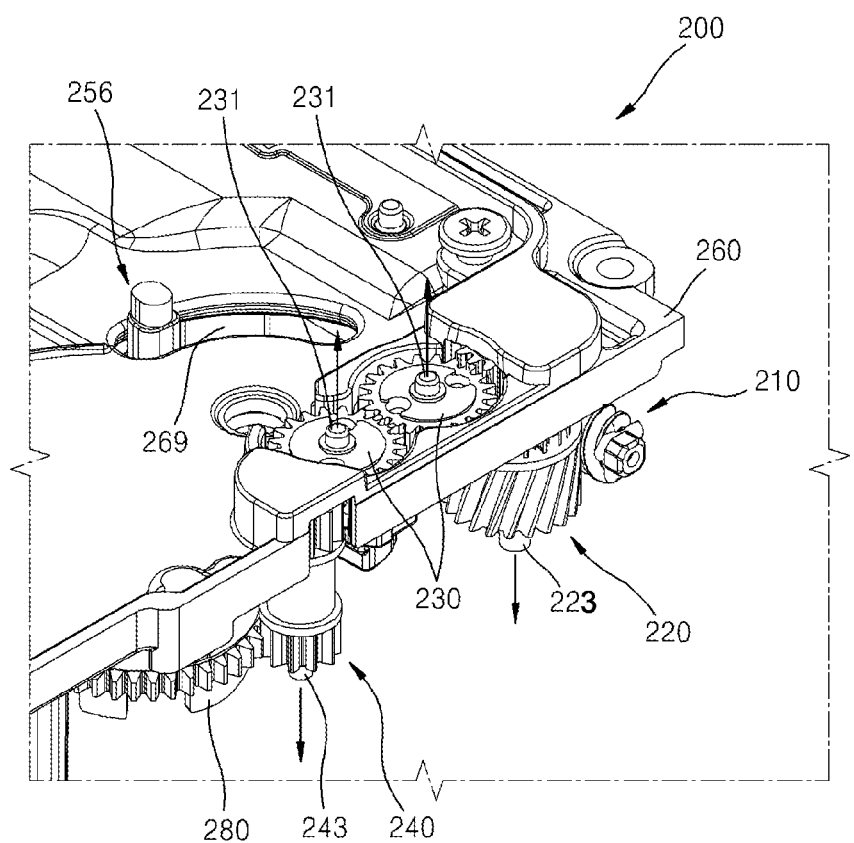
FIG. 6 is a perspective view showing an arrangement relationship between gears included in the shutter assembly of FIG. 3, according to another embodiment.

FIG. 6 is a perspective view showing an arrangement relationship between gears included in the shutter assembly 200 of FIG. 3, according to another embodiment.

Referring to FIG. 6, the transmission gear unit 230 may be disposed on an opposite surface of the support member 260 on which the input gear unit 220 and the output gear unit 240 are disposed.

In addition, a direction (indicated by arrows) in which the central axes 231 of the transmission gear unit 230 protrude from the support member 260 may be opposite to a direction (indicated by arrows) in which the central axis 223 of the input gear unit 220 and the central axis 243 of the output gear unit 240 protrude from the support member 260.

Figure 7:
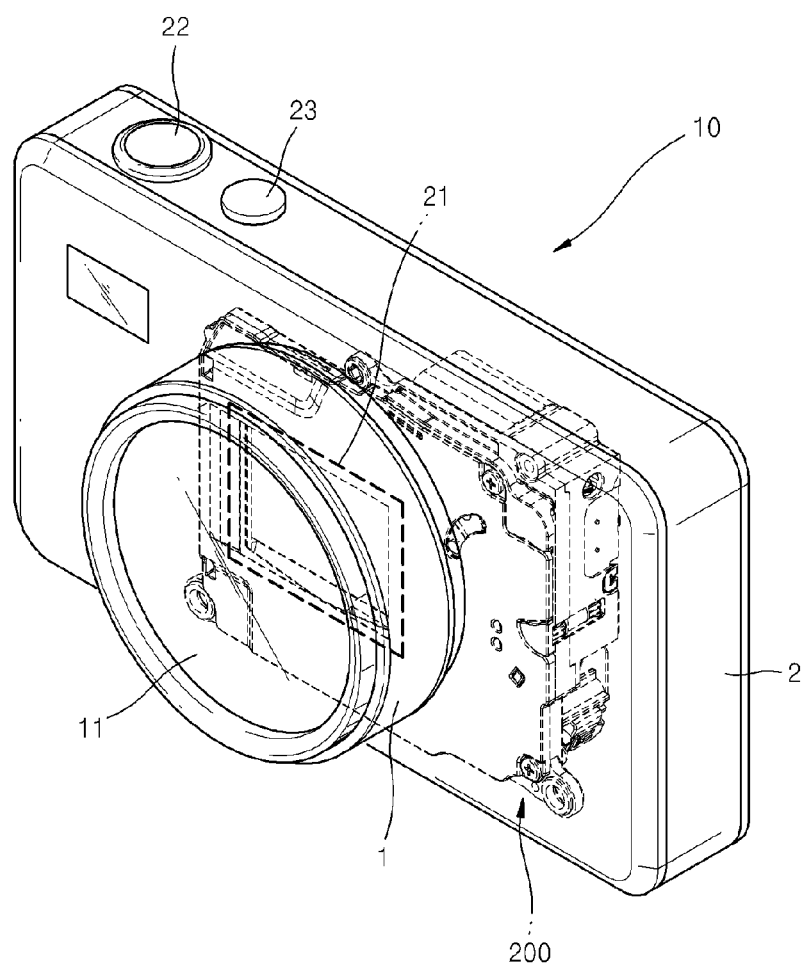
FIG. 7 is a schematic perspective view of a photographing apparatus including the shutter assembly of FIG. 3, according to another embodiment.

FIG. 7 is a schematic perspective view of a photographing apparatus 10 including the shutter assembly 200 of FIG. 3, according to another embodiment.

The photographing apparatus 10 includes a barrel unit 1, which includes an optical system 11, and a body unit 2. The shutter assembly 200 of FIG. 2 and an imaging device 21 are disposed in the body unit 2, wherein the imaging device 21 converts transmitted light into an electrical signal when the rotation unit 250 (see FIG. 3) included in the shutter assembly 200 is in a position for transmitting light.

According to the present embodiment, the shutter assembly 200 included in the photographing apparatus 10 is disposed in front of the imaging device 21 and functions as a focal plane shutter. However, the present embodiment is not limited thereto.

The imaging device 21 may be a solid imaging device such as a charge coupled device (CCD), a complementary metal-oxide semiconductor (CMOS), or the like.

A shutter release button 22, a power switch 23, and so on may be disposed on the body unit 2, wherein the shutter release button 22 opens or closes a shutter in order to expose light to the imaging device 21 for a predetermined period of time and the power switch 23 shuts power on/off.

According to the present embodiment, the photographing apparatus 10 includes the shutter assembly 200 of FIG. 3, and the transmission gear units 230 (see FIG. 3) included in the shutter assembly 200 are disposed to correspond to the rotation path of the rotation unit 250 so as to save space, thereby facilitating miniaturization of the photographing apparatus 10.

As described above, according to the one or more embodiments, a shutter assembly and a photographing apparatus are configured such that a rotation unit and a transmission gear unit are disposed in the same space to save space, thereby facilitating miniaturization of the shutter assembly and the photographing apparatus.

The digital photographing apparatus described herein may include a processor, a memory for storing and executing program data, a permanent storage unit such as a disk drive, a communication port for handling communications with external devices, and a user interface device such as a touch panel, keys, and buttons. The methods may be implemented as software modules or algorithms, and may be stored as program instructions or computer-readable codes executable on the processor on a computer-readable non-transitory recording medium. Here, examples of the computer-readable recording medium include a magnetic storage medium (e.g., a read-only memory (ROM), a random-access memory (RAM), a floppy disk, or a hard disk), and optical reading medium (e.g., a compact disk (CD)-ROM or a digital versatile disk (DVD)). The computer-readable recording medium may be distributed over network coupled computer systems so that the computer-readable code may be stored and executed in a distributed fashion. The computer-readable recording medium may be read by the computer, stored in the memory, and executed by the processor.

All references including publications, patent applications, and patents cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional blocks and various processing steps. Such functional blocks may be realized by any number of hardware or/and software components configured to perform specific functions. For example, the invention may employ various integrated circuit components, e.g., memory elements, processing elements, logic elements, and look-up tables, and the like, which may carry out a variety of functions under the control of one or more microprocessors or other control devices. Similarly, where the elements of the invention are implemented using software programming or software elements, the invention may be implemented with any programming or scripting language, such as C, C++, Java, or assembler, with various algorithms being implemented with any combination of data structures, objects, processes, routines, or other programming elements. Functional aspects may be implemented in algorithms that execute on one or more processors. Furthermore, the invention could employ any number of conventional techniques for electronics configuration, signal processing and/or control, data processing, and the like. The terms "mechanism", "element", "means", and "configuration" are broadly used, and are not limited to mechanical and physical embodiments, but can include software routines in connection with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections, may be present in a practical device. Moreover, no item or component is essential to the practice of the invention unless the element is specifically described as "essential" or "critical". The terms "comprising", "including", and the like used herein are used as terms of an open-type preamble of technologies.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A shutter assembly comprising:
a driver that generates a rotation force;
an input gear unit rotated by the driver;
a transmission gear unit rotated by the input gear unit;
an output gear unit rotated by the transmission gear unit;
a rotation unit that is rotated by the output gear unit between a position for transmitting light and a position for blocking light; and
a support member that rotatable supports the input gear unit, the transmission gear unit, and the output gear unit, wherein the support member comprises:
a first accommodating unit that accommodates an end portion of the input gear unit;
a second accommodating unit that accommodates the transmission gear unit;
a third accommodating unit that accommodates an end portion of the output gear unit;
a first through hole disposed between the first accommodating unit and the second accommodating unit; and
a second through hole disposed between the second accommodating unit and the third accommodating unit,
wherein the transmission gear unit at least partially corresponds to a rotation path of the rotation unit and is spaced apart from a surface containing the rotation path along a direction of a central axis of the transmission gear unit, and the input gear unit, the transmission gear unit, and the output gear unit are disposed on one side surface of the support member.

2. The shutter assembly of claim 1, wherein the input gear unit comprises:
a first input gear unit coupled to a driving gear coupled to a rotation axis of the driver and receives a rotation force from the driver, and
a second input gear unit that transmits a rotation force to the transmission gear unit, and
wherein the first input gear unit and the second input gear unit are disposed side by side along a direction of a central axis of the input gear unit.

3. The shutter assembly of claim 2, wherein the first input gear unit and the second input gear unit comprise different numbers of teeth.

4. The shutter assembly of claim 2, wherein:
the driving gear comprises a worm gear,
the first input gear unit comprises a helical gear, and
the second input gear unit comprises a spur gear.

5. The shutter assembly of claim 1, wherein the output gear unit comprises:
a first output gear unit that receives a rotation force from the transmission gear unit, and
a second output gear unit coupled to teeth included in the rotation unit and transmits a rotation force, and
wherein the first output gear unit and the second output gear unit are disposed side by side along a direction of a central axis of the output gear unit.

6. The shutter assembly of claim 5, wherein the first output gear unit and the second output gear unit comprise different numbers of teeth.

7. The shutter assembly of claim 1, wherein:
the first accommodating unit and the third accommodating unit are disposed on a first side surface of the support member,
the second accommodating unit is disposed on a second side surface of the support member,
the input gear unit and the transmission gear unit are coupled to each other through the first through hole, and
the transmission gear unit and the output gear unit are coupled to each other through the second through hole.

8. The shutter assembly of claim 7, further comprising a cover member disposed on the second side surface of the support member,
wherein the transmission gear unit is disposed between the support member and the cover member.

9. The shutter assembly of claim 1, wherein the transmission gear unit comprises a plurality of gears.

10. The shutter assembly of claim 1, further comprising a shutter plate comprising a through hole through which light is transmitted,
wherein the rotation unit comprises a blocking plate that opens or closes the through hole, and a lever that is coupled to the blocking plate and is rotated by the output gear unit, and
wherein the transmission gear unit at least partially corresponds to a rotation path of the lever and is spaced apart from the surface containing the rotation path along the direction of the central axis of the transmission gear unit.

11. The shutter assembly of claim 10, wherein:
the blocking plate comprises a first blocking plate and a second blocking plate that are spaced apart from each other when the through hole is opened and contact each other when the through hole is closed, and
the lever comprises a first lever and a second lever that respectively move the first blocking plate and the second blocking plate.

12. The shutter assembly of claim 11, further comprising a cam gear rotated by the output gear unit,
wherein the first lever and the second lever are simultaneously rotated by the cam gear.

13. A photographing apparatus comprising:
a driver that generates a rotation force;
an input gear unit rotated by the driver;

a transmission gear unit rotated by the input gear unit;

an output gear unit rotated by the transmission gear unit;

a rotation unit that is rotated by the output gear unit between a position for transmitting light and a position for blocking light;

a support member that rotatable supports the input gear unit, the transmission gear unit, and the output gear unit, wherein the support member comprises:

a first accommodating unit that accommodates an end portion of the input gear unit;

a second accommodating unit that accommodates the transmission gear unit;

a third accommodating unit that accommodates an end portion of the output unit;

a first through hole disposed between the first accommodating unit and the second accommodating unit; and a second through hole disposed between the second accommodating unit and the third accommodating unit; and an imaging device that converts transmitted light into an electrical signal when the rotation unit is in a position for transmitting light, wherein the transmission gear unit at least partially corresponds to a rotation path of the rotation unit and is spaced apart from a surface containing the rotation path along a direction of a central axis of the transmission gear unit, and the input gear unit, the transmission gear unit, and the output gear unit are disposed on one side surface of the support member.

14. The photographing apparatus of claim 13, wherein:

the first accommodating unit and the third accommodating unit are disposed on a first side surface of the support member, the second accommodating unit is disposed on a second surface of the support member, the input gear unit and the transmission gear unit are coupled to each other through the first through hole, and the transmission gear unit and the output gear unit are coupled to each other through the second through hole.

15. The photographing apparatus of claim 14, further comprising a cover member disposed on the second side surface of the support member, wherein the transmission gear unit is disposed between the support member and the cover member.

\* \* \* \* \*